(12) United States Patent
Attia

(10) Patent No.: US 8,304,926 B2
(45) Date of Patent: Nov. 6, 2012

(54) WIND TURBINE SOUND MANAGEMENT

(75) Inventor: Sid Ahmed Attia, Berlin (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/235,348

(22) Filed: Sep. 16, 2011

(65) Prior Publication Data

US 2012/0139254 A1    Jun. 7, 2012

(51) Int. Cl.
*F03D 9/00* (2006.01)
*H02P 9/04* (2006.01)

(52) U.S. Cl. .......................................... 290/44
(58) Field of Classification Search ............ 290/44, 290/55
See application file for complete search history.

(56) References Cited

U.S. PATENT DOCUMENTS

| | | | |
|---|---|---|---|
| 6,688,841 B1 * | 2/2004 | Wobben | 415/1 |
| 6,729,846 B1 * | 5/2004 | Wobben | 416/241 A |
| 8,013,460 B2 | 9/2011 | Kinzie et al. | |
| 2010/0133817 A1 | 6/2010 | Kinzie et al. | |
| 2010/0135798 A1 | 6/2010 | Eggleston | |
| 2010/0143119 A1 * | 6/2010 | Kooijman et al. | 416/1 |
| 2011/0006527 A1 | 1/2011 | Kinzie et al. | |
| 2011/0175356 A1 * | 7/2011 | Nielsen et al. | 290/44 |
| 2011/0223006 A1 | 9/2011 | Loh et al. | |
| 2012/0025530 A1 * | 2/2012 | Kinzie et al. | 290/44 |
| 2012/0027590 A1 | 2/2012 | Bonnet | |

FOREIGN PATENT DOCUMENTS

| | | |
|---|---|---|
| EP | 2216549 A2 | 8/2010 |
| EP | 2273105 A2 | 1/2011 |
| EP | 2273109 A1 | 1/2011 |
| EP | 2306004 A2 | 4/2011 |
| EP | 1944667 B1 | 7/2011 |
| WO | 2010061255 A2 | 6/2010 |

* cited by examiner

*Primary Examiner* — Javaid Nasri
(74) *Attorney, Agent, or Firm* — Global Patent Operation; Douglas D. Zhang

(57) ABSTRACT

A method for operating a wind turbine is provided. The wind turbine generates a sound level. The method includes selecting a desired sound level; calculating at least one operating parameter by inputting the desired sound level to a model; and operating the wind turbine according to the at least one operating parameter. The method further includes measuring the sound level and based on the measured sound level, calculating at least one of a redefined desired sound level and a revised model. Furthermore, the method includes calculating at least one redefined operating parameter by at least one of inputting the redefined desired sound level to the model and inputting the desired sound level to the revised model.

20 Claims, 6 Drawing Sheets

WIND TURBINE SOUND MANAGEMENT

BACKGROUND OF THE INVENTION

The subject matter described herein relates generally to methods and systems for operating a wind turbine or a wind farm, and more particularly, to methods and systems for operating a wind turbine or a wind farm under noise management.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

During operation of such known wind turbines, rotational transiting of the blades through air generates aerodynamic acoustic emissions in the form of audible noise. These acoustic emissions may produce noise with a decibel (dB) level that may approach or even exceed local regulatory levels. Accordingly, at least some methods exist for controlling noise from a wind turbine or a wind turbine installation including a plurality of wind turbines (i.e., a wind farm). In particular, a wind turbine may be operated such that produced noise is below predetermined dB parameters. Such an operation of a wind turbine for reducing acoustic emissions is also known as noise reduction operation (NRO) or operation under sound power management (SPM).

NRO typically implies that a wind turbine generates an electric power below the maximum possible power generation capacity of the wind turbine. Therefore, the operational state of a wind turbine under noise reduction operation is normally not directed to achieve a maximum power output but to comply with noise regulations applying to the wind turbine. However, during SPM, it is important to still yield the maximum amount of electric power that is possible under the prescribed regulations.

In practice, however, it turns out that the operation under SPM does not always lead to the desired results. In some cases, the resulting generated power is below that of what could be expected given the allowed noise power level. In yet further situations, the resulting noise does still exceed the allowed level although it should not. Hence, it is a desire to improve the operation under SPM, in particular, it is a desire to increase the power output of a wind turbine or a wind farm operating under SPM. It is also particularly desirable that the noise regulations are met during operation under SPM.

BRIEF DESCRIPTION OF THE INVENTION

In one aspect, a method for operating a wind turbine is provided. The wind turbine generates a sound level. The method includes selecting a desired sound level; calculating at least one operating parameter by inputting the desired sound level to a model; and operating the wind turbine according to the at least one operating parameter. The method further includes measuring the sound level and based on the measured sound level, calculating at least one of a redefined desired sound level and a revised model. Furthermore, the method includes calculating at least one redefined operating parameter by at least one of inputting the redefined desired sound level to the model and inputting the desired sound level to the revised model.

According to aspects, the method is performed in the sequence described.

In another aspect, a wind turbine is provided that includes a rotor with at least one rotor blade; a generator for converting kinetic energy supplied by the rotor into electric energy; and a control system for operating the wind turbine. The control system is configured to calculate at least one operating parameter by inputting a desired sound level to a model; operate the wind turbine according to the at least one operating parameter; obtain a measured sound level; based on the measured sound level, calculate at least one of a redefined desired sound level and a revised model; and calculate at least one redefined operating parameter for operating the wind turbine by one of inputting the redefined desired sound level to the model and inputting the desired sound level to the revised model.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine that can be operated under sound power management in an improved manner. More specifically, the operation of the wind turbine allows for yielding a high energy output given the allowed sound level under SPM. In addition, the operation of the wind turbine allows particularly for achieving the prescribed sound level emission requirements.

As used herein, the terms "sound power" and "noise" are used synonymously, and are intended to be representative of the overall acoustic emission of a wind turbine. Evidently, the sound power of a wind farm refers to the overall acoustic emission of a wind farm. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power. The term "wind farm" refers to a plurality of wind turbines.

Figure 1:
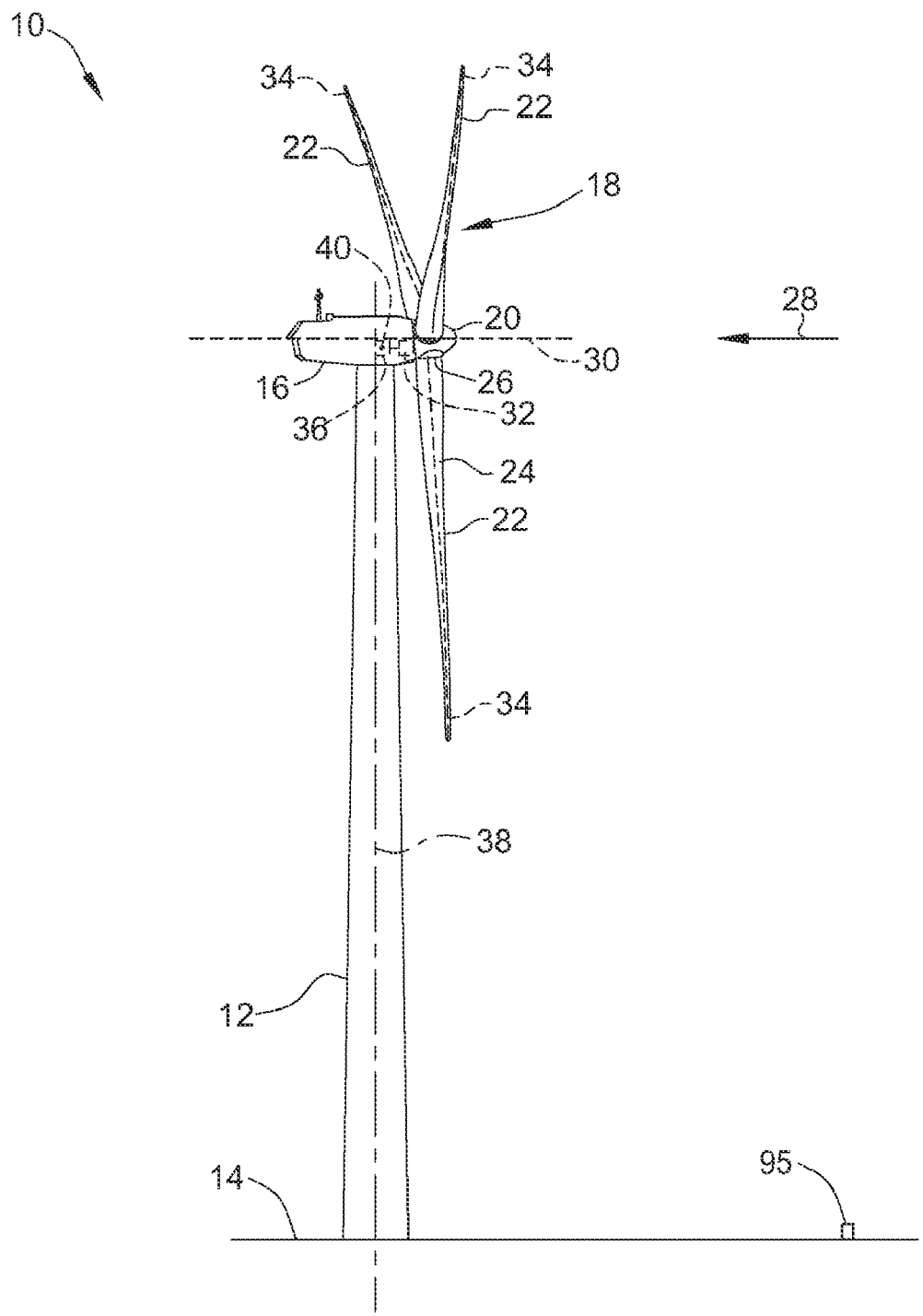
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a control system, a microcontrol system, a microcomputer, a programmable logic control system (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic control system (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
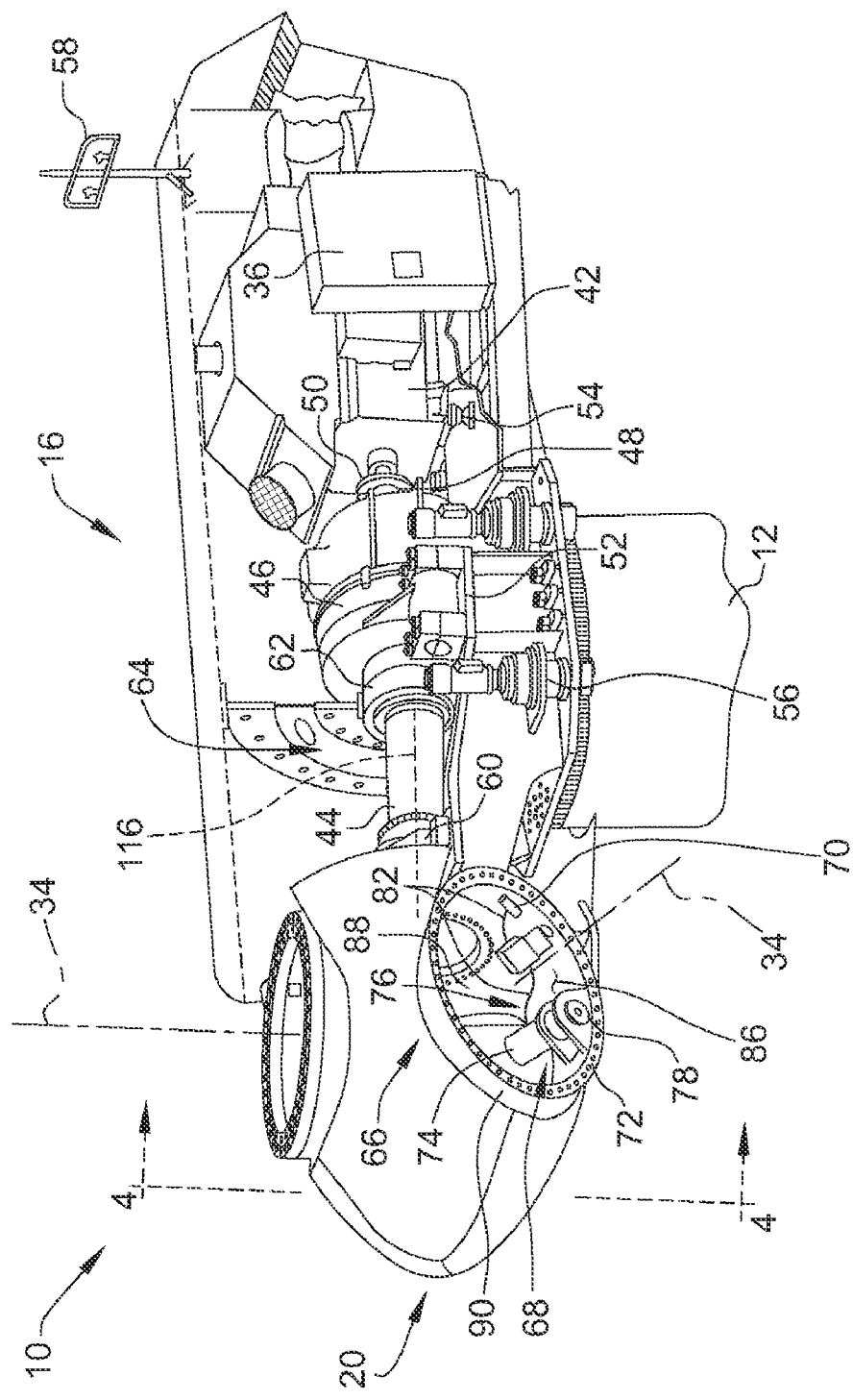
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and/or an anemometer (neither shown in FIG. 2). According to aspects, mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 20 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 20 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 20 and/or a stored energy source (not shown) that supplies energy to components of wind turbine 10.

According to aspects described herein, the wind turbine includes a sound measurement device 95. The sound measurement device may be positioned at some distance from the tower 12, for instance, at a distance of at least 100 m, or at a distance of at least 200 m. The sound measurement device may be placed, for instance, downwind with respect to the standard wind direction. Generally, under sound power management control, the wind turbine is not allowed to exceed a permissible sound level. The permissible sound level may vary dependent on the time of day or night, or dependent on the wind direction, the wind power etc. Typically, the permissible sound level is prescribed in national, regional or local regulations. The noise impact to people living in the neighborhood of the wind turbines shall be limited.

Despite the limited allowance to operate the wind turbine at full power, it is desirable to yield the maximum amount of energy given the allowed sound level. That is, in view of the allowed power level it is desirable to find the operating parameters of the wind turbine that allow the maximum power output. The operating parameters of the wind turbine that are of interest for this purpose are particularly the pitch angle, the rotational speed of the rotor, the desired power and the torque.

According to aspects described herein, the generated sound level is measured. Sound level measurement is typically undertaken at a distance from the wind turbine, such as at a distance of hub height plus half of the rotor diameter away from the wind turbine. The distance is typically selected in dependence of the hub height, the rotor diameter and/or the rated power. However, it is also possible to measure the sound level at the wind turbine which might allow for conclusions on the sound distribution in the vicinity of the wind turbine. Measuring the sound level typically includes directly the sound level, e.g., by means of a microphone, or indirectly determining the sound level, e.g., by calculating the sound level on the basis of a model to which data such as speed, pitch angle, atmospheric measurement, torque etc are typically inputted.

The measured sound is transmitted to the control system of the wind turbine. The control system takes the feedback signal into account when determining the operating parameters of the wind turbine such as, but not limited to, the optimal speed set-points, the optimal pitch offsets, the desired power and/or the optimal torque.

The benefit of the proposed scheme is an increase in the precision of control and thus an increase in the energy yielded under the sound power management control scheme in view of the given noise regulations.

Figure 3:
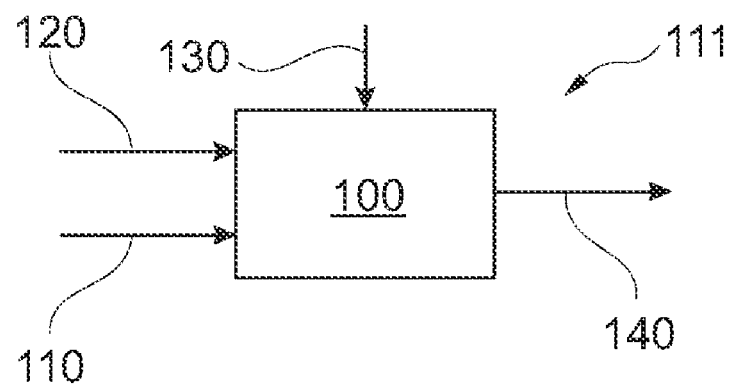
FIG. 3 is a schematic diagram illustrating a noise map according to embodiments described herein.

The sound level model shall be explained with respect to the following figures. To start with, as illustrated in FIG. 3, sound model 111 consists of a function 100 that maps a pitch angle 120, a tip speed 110 and a wind speed 130 to an associated sound level 140. That is, the function 100 calculates how much noise the turbine would generate at any given pitch angle, tip speed, and wind speed. Generally, and not limited to this embodiment, the function 100 may be a static function, i.e. described by algebraic equations, or a dynamic function, i.e., described by (partial) differential equations, recurrence equations, difference equations or state automata. In embodiments, it may be thus necessary to provide a memory for calculating the dynamic function.

In particular, the function 100 may be used to calculate the associated sound level 140 based on the optimal pitch angle and tip speed for all possible wind speeds. The "optimal pitch angle" and the "optimal tip speed" are defined as the pitch and tip speed setting that maximize the power generated under given wind conditions and the permissible sound level. The function 100 is usually obtained by running a couple of offline numerical optimization problems under appropriate software. The function 100 is supposed to represent the real world, that is, the noise generated by a real world turbine if operated at the given parameters.

Generally, and not limited to the present embodiment, the term "sound level" may particularly include the sound power level or the sound pressure. Typically, the sound level is directly measured by means of a sound measurement device, such as a microphone or the like. Alternatively it is possible to deduce the sound level by way of calculation from other measurements.

Figure 4:
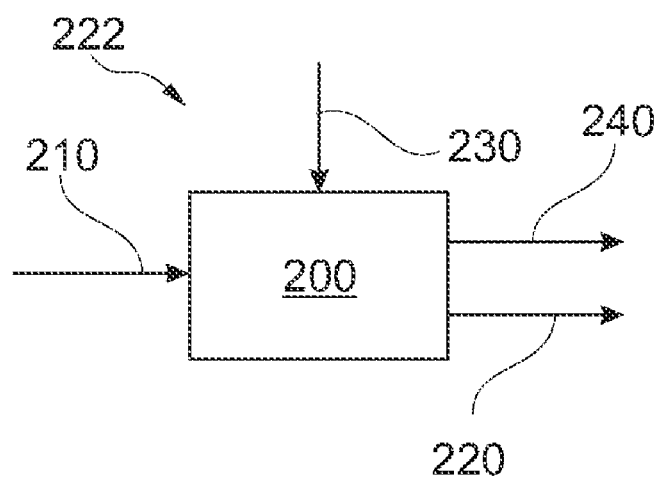
FIG. 4 is a schematic diagram illustrating a noise inverse map according to embodiments described herein.

The model 111 illustrated with respect to FIG. 3 can be used for defining an appropriate noise inverse map 222 illustrated with respect to FIG. 4. The inverse function 200 defines a new function that outputs the respective settings such as the tip speed and pitch setting to be applied to a real wind turbine based on a desired level of sound. In more detail, as exemplarily illustrated in the figure, the desired maximal sound level 210 is inputted to the inverse function 200. In the embodiment illustrated, the desired maximal sound level 210 is a function in dependence of the wind speed but could generally be dependent also on other variables. Given the measured wind speed 230, the inverse function 200 determines the corresponding pitch angle 240 and the rotor blade tip speed 220.

The noise inverse function 200 as illustrated with respect to FIG. 4 is usually obtained by numerical methods based on the noise function 100 as exemplarily illustrated with respect to FIG. 3.

Figure 5:
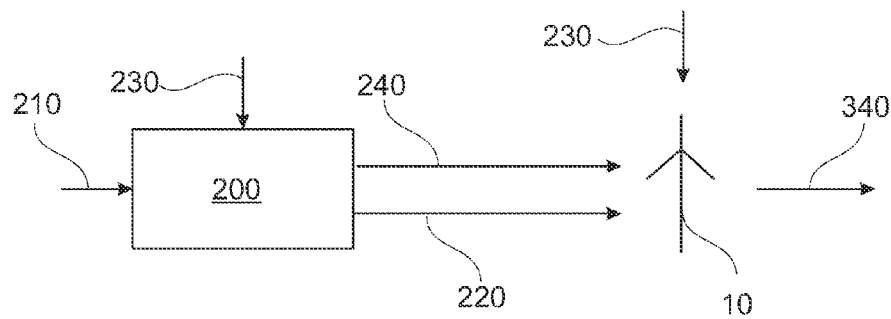
FIG. 5 is a schematic diagram illustrating the known operation of a wind turbine.

The conventional sound level control scheme is shown in FIG. 5. Given a desired sound level 210 and a given wind speed 230, the noise inverse function 200 calculates the corresponding wind turbine settings such as, but not limited to, the pitch angle 240 and tip speed 220. These values are used for the operation of the wind turbine 10. The wind turbine control thus adjusts the respective settings. For instance, it may pitch the blades.

Given the operation under the settings 220 and 240 as well as under the given wind conditions, the turbine generates an amount of noise which is illustrated as the sound level 340 in FIG. 5.

In theory, the desired noise power level 210 and the sound level 340 emitted by the wind turbine should be identical. This is because the noise inverse function 200 should be, in theory, the function that is inverse to what sound level the wind turbine produces at a given wind speed.

However, experience shows that, in practice, there are differences between the desired sound level 210 and the emitted sound level 340. There can be several reasons for this. One reason can be that the computer model and the real system do not match exactly. That is, the noise function 100 and consequently the noise inverse function 200 do not fully comply with the reality. For instance, the theoretical calculation of the emitted sound level is 5% below what the real sound emission level is. In this case, the turbine is operated with prohibited noise emissions. Another reason can be that the wind speed is not measured with the necessary accuracy, that is, the wind speed level 230 as illustrated in the present figures does not fully match the real wind speed.

Hence, as a result of these obstacles, in practice there is a mismatch between the desired sound level and the factual emitted sound level is persistent. This mismatch can have various negative effects. For instance, the wind turbine could operate at a lower efficiency level than the one corresponding to the desired sound level. This causes commercial disadvantage. Another effect could be that the actual sound level exceeds the desired and permissible sound level, which causes undue sound annoyance for the neighbors. Furthermore, in case of a repeated excess of the permissible sound level, the wind turbine operator might be forced to drastically reduce the operation or even shut down the wind turbine.

Hence, in order to address those issues, according to aspects described herein, a feedback signal of the sound level is employed in order to reduce or eliminate the mismatch between the theoretical mapping and the real world situation. According to embodiments, both the measured noise and a modeled noise are used for the control of the wind turbine.

Figure 6:
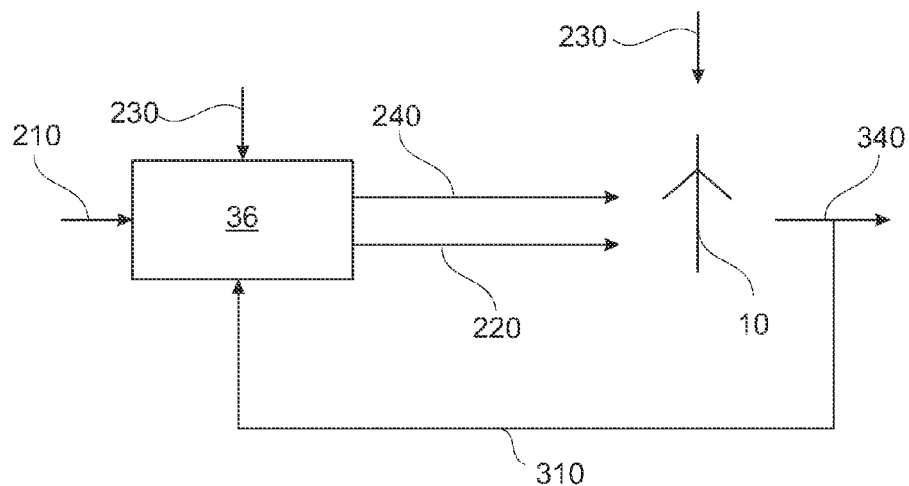
FIG. 6 is a schematic diagram illustrating the operation of a wind turbine according to embodiments described herein.

A possible proposed scheme is shown in FIG. 6. The sound level 340 is measured and fed back to a control system 36, which properly updates the operating parameters of the wind turbine with information such as the tip speed, torque, power and/or pitch setting. As illustrated in FIG. 6, the feedback line 310 allows for the feeding back of the sound level 340 to the control system 36. The control system 36 is configured to calculate the noise inverse function, referred to by reference number 200 in the other figures. In addition, the control system may be configured to calculate a mismatch between the desired sound level 210 and the actual sound level 340. The mismatch is then considered when the turbine settings are calculated, such as the pitch angle 240 or the tip speed 220.

According to embodiments, the feedback line 310 is active only if the difference between the actually generated noise 340 and the desired sound level 210 is non-zero. Alternatively, in case there is no mismatch between the sound level 140 and the desired sound level 210, the feedback line 310 may send a signal corresponding to zero.

In the following, it shall exemplarily be explained in more detail how the feedback is performed. In case there is a mismatch between the desired sound level 210 and the actual sound level 340, the control system 36 re-defines the desired sound level 210 as follows:

$$L_c = L_d - (L_m - L_M) \quad (1)$$

In this equation (1), $L_c$ refers to the re-defined sound level that is subsequently inputted to the inverse function 200 as basis for the calculation of corrected turbine settings. $L_d$ refers to the desired sound level which is referred to by reference number 210 in the figures. $L_m$ refers to the measured sound level which is referred to by reference number 340 in the figures. $L_M$ refers to the sound level according to the noise function that was referred to by reference number 100 previously. This sound level is referred to by reference number 140 in FIG. 3.

Figure 7:
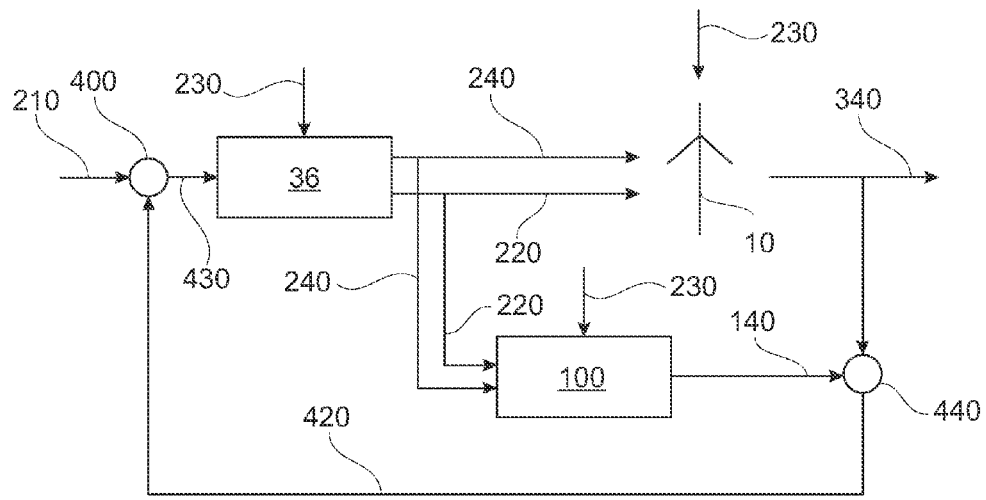
FIG. 7 is a schematic diagram illustrating the operation of a wind turbine according to embodiments described herein.

FIG. 7 illustrates an embodiment for a method as described herein. The control system 36 receives the actual wind speed 230. In addition, the desired sound level 210 may be inputted to the control system 36, or, if a feedback signal is already available, the re-defined desired sound level 430. For instance, if there is no feedback signal available (maybe because the operation of the turbine has started shortly before or because there is no mismatch between the desired sound level and the actually generated sound level), the desired sound level 210 is equal to the re-defined sound level 430. However, in the case that there is a feedback signal, the re-defined sound level 430 is calculated as described, i.e. the redefinition factor 420, calculated as $L_m - L_m$, is subtracted from the desired sound level 210 thus yielding to the re-defined desired sound level 430. The re-definition factor 420 corresponds to the parenthesis in the equation (1).

In FIG. 7, a first subtractor 400 serves to subtract the re-definition factor 420 from the desired sound level 210. In other words, the first subtractor 400 calculates $L_c$ according to equation (1).

According to typical embodiments, the first subtractor 400 is part of the control system 36 although, for clarity reasons, it is shown separately from the control system 36 in FIG. 7. Thus, the control system is typically configured to calculate the corrected sound level $L_c$. In addition, the control system is configured to calculate the corresponding turbine settings based on an inputted desired sound level.

According to aspects described herein, at least when there is a feedback signal, the control system does not calculate the wind turbine settings on the basis of the given desired sound level $L_d$, referred to as number 210, but, instead, uses the corrected sound level $L_c$, referred to as number 430 as a basis for the calculation of the wind turbine settings such as the pitch angle 240, the tip speed 220, the torque (omitted in the drawings in order to facilitate reading) or the like.

The control system 36 thus bases its calculation of the turbine settings on an 'incorrect' desired sound level in the sense that this sound level is different from the desired sound level $L_d$. In other words, according to an aspect, the concept of the present disclosure is not to use the feedback signal and the mismatch information thereof for an improvement of the underlying noise function but, instead, to accept that the theoretic noise function 200 does not perfectly match the real world and to avoid discrepancies nevertheless by feeding re-defined desired sound levels to the calculation. These re-defined sound levels differ from the actually desired sound level according to the theoretic noise inverse function 200.

For instance, in theory, that is according to the noise inverse function 200, the re-defined sound level might even be higher than the actually allowed sound level. Nevertheless, given the discrepancies between the real world system 100 and the theoretic noise inverse function 200, this re-defined sound level might lead to turbine settings that exactly meet the allowed noise power level in practice.

According to another aspect of the present disclosure, the feedback signal and the mismatch information associated therewith are used for improving the underlying noise function, in particular, to adjust the internal parameters of the model. For instance, the noise function may be adapted once there is a feedback signal indicating a mismatch in an iterative manner.

The control system 36 calculates the corresponding wind turbine settings such as, but not limited to, the pitch angle 240 and the rotor blade tip speed 220. Based on this information, the wind turbine operates according to the respective wind turbine settings. Thereby, the wind turbine produces noise which is shown as the sound level 340.

In addition, the calculated turbine settings such as the pitch angle 240 and the rotor blade tip speed 220 (as well as further parameters which were omitted for clarity reasons in the figures) are supplied to noise function 100 that maps the wind turbine settings, along with the wind speed 230, to the theoretically associated sound level 140 which was named $L_M$ in the previous equation (1).

According to the embodiment shown in FIG. 7, a second subtractor 440 is provided that subtracts the modeled sound level $L_M$, referred to by reference number 140, from the measured sound level $L_m$, referred to by reference number 340. As set forth previously, the resulting correction factor $L_m-L_M$, referred to by reference number 420 in FIG. 7, is then provided, directly or via the first subtractor 400, to the control system 36. According to other embodiments, the control system 36 is used for the subtraction of the modeled sound level $L_M$, referred to by reference number 140, from the measured sound level $L_m$, referred to by reference number 340 instead of a specific subtractor.

Figure 8:
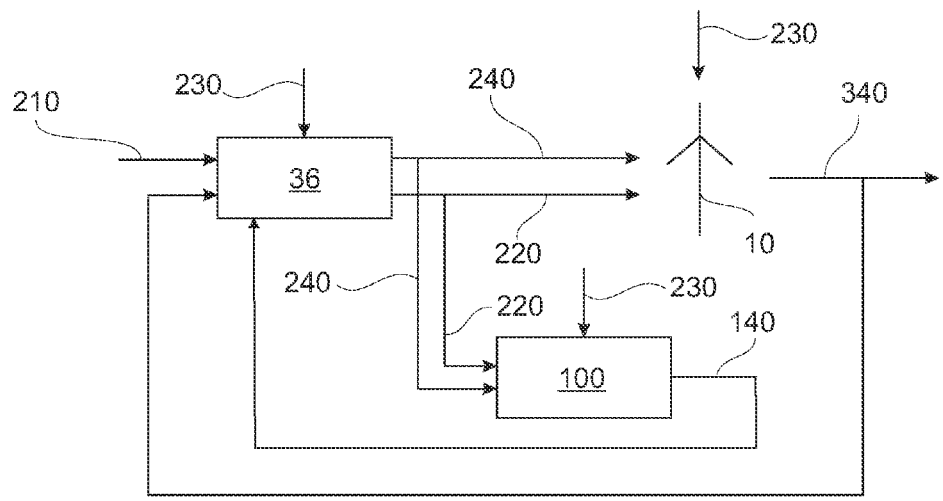
FIG. 8 is a schematic diagram illustrating the operation of a wind turbine according to embodiments described herein.

FIG. 8 illustrates an embodiment wherein the complete calculation is done by one control system, that is, control system 36. Typically, the control system is the control system of the wind turbine. The control system receives the desired sound level $L_d$, referred to by number 210, the measured sound level $L_m$, referred to by number 340, and the modeled sound level $L_M$, referred to by number 140. The sound level may refer, for instance, to a sound power level, a sound pressure level, or any other relevant noise measurement. Generally, and not limited to the present embodiment, the models can be static. According to other embodiments, the models can be dynamic The control system calculates the corrected sound level $L_c$ and inputs it into the noise inverse function as explained with respect to previous figures. The outcome is turbine settings, such as, the pitch angle 240, the wind blade tip speed 220, torque settings (not shown) or other settings for operating the wind turbine.

Figure 9:
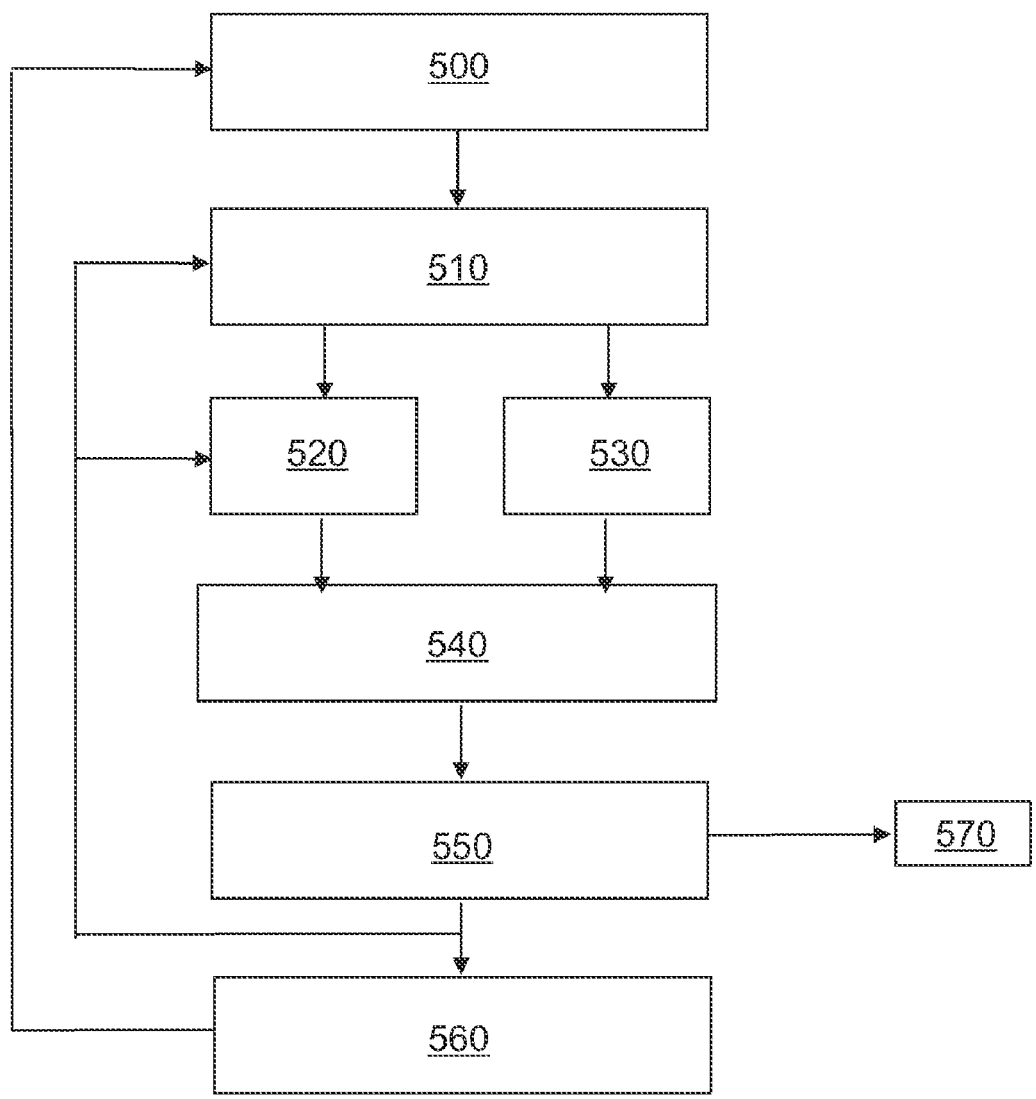
FIG. 9 is a schematic diagram illustrating the method for operating a wind turbine as described herein.

FIG. 9 illustrates a method for operating a wind turbine according to embodiments described herein. In block 500, a desired sound level $L_d$ is selected. For instance, and not limited to the present embodiment but applicable to all embodiments described herein, the desired sound level $L_d$ can be selected by an operator, it may be retrieved from a database, or it may be retrieved from a processor outputting the desired sound level. For instance, some regulations prescribe reduced sound emission at night. Hence, the desired sound level might be adjusted according to the time of the day. Also, the regulations may vary dependent on the seasons, the weather or the like.

The desired sound level may be chosen in dependence of the wind speed and/or the ambient noise. For instance, for each value of the wind speed, a selected sound level should be achieved. According to embodiments, the desired sound level is a function of the ambient noise. For instance, if the ambient noise is high, the desired sound level may be selected high compared to a situation with low ambient noise. Hence, according to embodiments described herein, the wind turbine may further include a sound measurement device for measuring the ambient noise.

According to the next block 510, the noise inverse function (referred to as reference number 200 in previous figures) is used to calculate the respective turbine settings for operating the turbine from the desired sound level $L_d$, typically under consideration of the actual wind speed. The turbine settings particularly include the pitch angle, the tip speed, and the torque.

According to the next block 520, the calculated turbine settings are used for operating the wind turbine. Possibly, but not necessarily at the same time, according to block 530, the calculated turbine settings are inputted to the noise function that has been referred to as reference number 100 in previous figures. The noise function therefrom calculates the theoretic sound level $L_M$. According to embodiments, the sound pressure level is calculated instead of the sound level and compared with the respective measured sound pressure level.

According to block 540, the actual sound level $L_m$ is measured. Typically, a certain amount of time is waited between amending the wind turbine settings and measuring the generated noise in order to obtain a realistic measurement value referring to the operation at the desired settings, and not a measurement value relating to the transition time between the different operational modes.

According to block 550, the measured sound level is compared to the desired sound level $L_d$. In the event that they are identical, no changes need to be made to the settings. Hence, it is possible to stop the method, that is, to proceed to block 570 which represents the end. Alternatively, it is possible to wait for a selected amount of time, such as between 1 and 100 minutes, typically between 10 and 50 minutes, depending on the turbine and the application, before restarting the procedure again. For instance, if the desired sound level $L_d$ has not changed, the method is continued with block 510, i.e. the calculation of the turbine settings, or with block 520, i.e. the measurement of the actual wind speed. In those cases where the desired sound level $L_d$ is reset (for instance, because a specific time of the day is reached), it is possible to restart the method with block 500 again (this alternative is not shown in FIG. 9).

In case there is a mismatch between the desired sound level $L_d$ and the measured sound level $L_m$, a re-defined desired sound level $L_c$ is calculated in block 560. The calculation is performed as described previously and particularly with reference to equation (1). The re-defined sound level $L_c$ is used for the calculation of the subsequent wind turbine settings. Thus, instead of taking the desired sound level $L_d$ as basis for the calculation of the wind turbine settings, the re-defined desired sound level $L_c$ is taken, and the method is repeated under this condition. This is shown in FIG. 9 wherein the connection from block 560 to block 500 shall indicate that the re-defined desired sound level is used as the new desired sound level.

The method can be repeated as long as the desired wind power level is not identical to the measured sound level. The term "identical" in this sense shall include deviations of 3% at maximum, typically of 1% or even 0.5% at minimum (in terms of decibel (db)). It is not shown in FIG. 9, however, it is possible to stop the method, for instance, when wind conditions are such that the turbine has to be stopped, or in the event that the night is over and normal power optimized operation of the turbine is possible again. Generally, and not limited to this embodiment, the calculation of the settings and the control of the turbine may be influenced by further circumstances such as the time of day, change in the wind (strength and direction), number of gusts etc. It is furthermore possible according to the embodiments described herein that the method is stopped if the wind speed is decreasing and thus leading to noise emissions that are clearly allowable under energy optimized control.

The above-described systems and methods facilitate and improve the control of one or more wind turbines under SPM. More specifically, they allow for better adherence to the regulations whilst improving the energy yield at the same time.

Exemplary embodiments of systems and methods for one or more wind turbines are described above in detail. The systems and methods are not limited to the specific embodiments described herein, but rather, components of the systems and/or steps of the methods may be utilized independently and separately from other components and/or steps described herein. Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention (including the best mode) and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for operating a wind turbine, wherein the wind turbine generates a sound level, the method comprising:
    calculating at least one operating parameter by inputting a desired sound level to a model;
    operating the wind turbine according to the at least one operating parameter;
    measuring the sound level;
    based on the measured sound level, calculating at least one of a redefined desired sound level and a revised model; and
    calculating at least one redefined operating parameter by at least one of inputting the redefined desired sound level to the model and inputting the desired sound level to the revised model.

2. The method for operating the wind turbine according to claim 1, wherein
    calculating at least one of the redefined desired sound level and the revised model comprises only calculating the redefined desired sound level; and
    calculating at least one redefined operating parameter is done by inputting the redefined desired sound level to the model.

3. The method according to claim 1, wherein the redefined desired sound level is allowed to be above the desired sound level.

4. The method according to claim 1, wherein the desired sound level corresponds to the sound level prescribed by wind turbine operation regulations.

5. The method for operating a wind turbine according to claim 1, wherein the redefined sound level is calculated as the desired sound level minus a sound level redefinition factor.

6. The method for operating a wind turbine according to claim 5, wherein the sound level redefinition factor is calculated as the measured sound level minus a modeled sound level.

7. The method for operating a wind turbine according to claim 1, further comprising operating the wind turbine according to the redefined operating parameter.

8. The method for operating a wind turbine according to claim 7, wherein the method is performed as a loop.

9. The method for operating a wind turbine according to claim 8, wherein the loop is performed continuously.

10. The method for operating a wind turbine according to claim 8, wherein the loop is repeated in selected time intervals.

11. The method for operating a wind turbine according to claim 1, wherein the desired sound power level is selected in dependence of at least one of the daytime, the wind direction, and the wind speed.

12. The method for operating a wind turbine according to claim 1, wherein at least one of the operating parameter for operating the wind turbine and the redefined operating parameter for operating the wind turbine are selected from a pitch angle, a blade tip speed, a torque, and a power.

13. The method for operating a wind turbine according to claim 1, the method further comprising comparing the desired sound level with the measured sound level.

14. The method for operating a wind turbine according to claim 13, wherein calculating at least one of a redefined desired sound level and a revised model is not undertaken if the desired sound level is identical to the measured sound level.

15. A wind turbine comprising:
a rotor including at least one rotor blade;
a generator for converting kinetic energy supplied by the rotor into electric energy; and
a control system for operating the wind turbine, the control system being configured to:
- calculate at least one operating parameter by inputting a desired sound level to a model;
- operate the wind turbine according to the at least one operating parameter;
- obtain a measured sound level;
- based on the measured sound level, calculate at least one of a redefined desired sound level and a revised model; and
- calculate at least one redefined operating parameter for operating the wind turbine by one of inputting the redefined desired sound level to the model and inputting the desired sound level to the revised model.

16. The wind turbine according to claim 15, wherein the control system is configured to adapt at least one of a torque of the generator and a pitch angle of the at least one rotor blade.

17. The wind turbine according to claim 15, further comprising a mast for providing at least one of a wind direction and a wind speed to the control system.

18. The wind turbine according to claim 15, wherein
calculating at least one of a redefined desired sound level and a revised model comprises only calculating the redefined desired sound level; and
calculating at least one redefined operating parameter is done by inputting the redefined desired sound level to the model.

19. The wind turbine according to claim 15, further comprising a sound measurement device.

20. The wind turbine according to claim 19, further comprising a tower wherein the sound measurement device is positioned at a distance of at least 100 m from the tower.

* * * * *

UNITED STATES PATENT AND TRADEMARK OFFICE
CERTIFICATE OF CORRECTION

| | | |
|---|---|---|
| PATENT NO. | : 8,304,926 B2 | Page 1 of 1 |
| APPLICATION NO. | : 13/235348 | |
| DATED | : November 6, 2012 | |
| INVENTOR(S) | : Sid Ahmed Attia | |

It is certified that error appears in the above-identified patent and that said Letters Patent is hereby corrected as shown below:

In the Specification:

In Column 8, Line 53, delete "$L_m$-$L_m$," and insert -- $L_m$-$L_M$, --, therefor.

In Column 10, Line 4, delete "dynamic" and insert -- dynamic. --, therefor.

In the Claims:

In Column 12, Line 17, in Claim 2, delete "the wind" and insert -- a wind --, therefor.

In Column 12, Line 26, in Claim 3, delete "method" and insert -- method for operating a wind turbine --, therefor.

In Column 12, Line 29, in Claim 4, delete "method" and insert -- method for operating a wind turbine --, therefor.

Signed and Sealed this
Ninth Day of April, 2013

Teresa Stanek Rea
*Acting Director of the United States Patent and Trademark Office*